May 1, 1962 J. WALBAUM 3,031,857
LIQUID GAS EVAPORATION PLANT
Filed Jan. 11, 1960
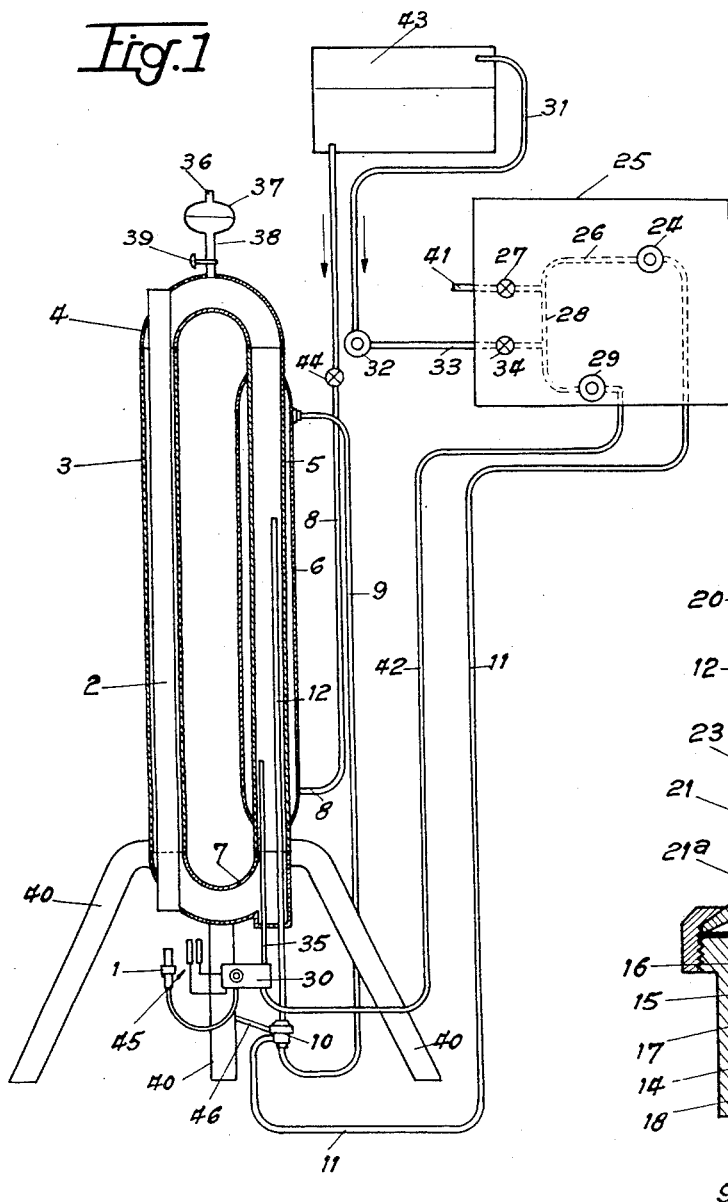
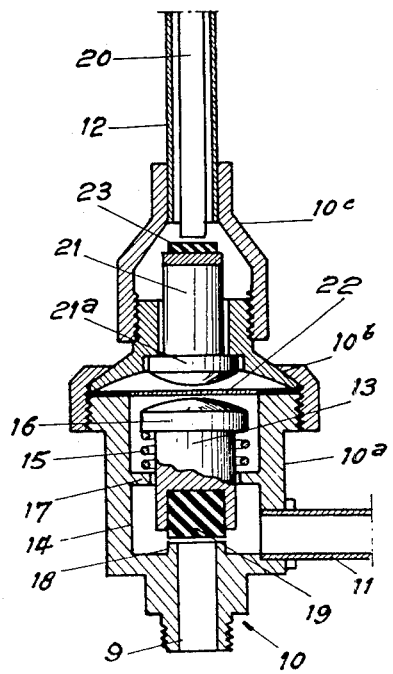

United States Patent Office 3,031,857
Patented May 1, 1962

3,031,857
LIQUID GAS EVAPORATION PLANT
Jacques Walbaum, Paris, France
(12 Ave. de Beaujeu, Saint-Maur (Seine), France)
Filed Jan. 11, 1960, Ser. No. 1,588
Claims priority, application France Jan. 14, 1959
4 Claims. (Cl. 62—52)

The invention relates to a liquid gas evaporation plant for supplying various gas consumption points from a reservoir containing a liquefied gas such as butane, propane or the like.

One object of the invention is to provide an installation capable of functioning entirely automatically and autonomously and possessing means for ensuring complete safety.

Another object is to provide a particularly advantageous type of evaporator for use in such installation, such evaporator comprising a circuit of liquid which ensures by thermosiphonic action, and without loss of charge, the heating of a casing containing the liquefied gas, and a thermostatic device operative for arresting delivery of vaporized gas in the event of cooling of the liquid in said circuit.

Yet another object is to provide pipe systems and expansion valve or pressure reducing devices which permit of working according to circumstances, either by passing through the evaporator the liquid phase contained in the reservoir (the normal working of the installation), or by making use of the gaseous phase in the reservoir (the relief working or the starting up of the installation).

Other objects and advantages of the invention will be apparent from the following description having reference to the annexed drawing illustrating, by way of example, one practical installation in accordance with the invention, in which drawing:

FIGURE 1 is a diagram of an installation in accordance with the invention, the evaporator itself being shown in vertical section.

FIGURE 2 is a vertical section, to a larger scale, of a thermostatic device associated with the evaporator.

In FIGURE 1, a burner 1 is seen disposed in the lower part of the apparatus and the products of combustion from this burner pass into a chimney 2 constituted by a steel tube which traverses a branch 3 of an annular circuit formed by steel tubing. This circuit contains a heating liquid and comprises an upper bend 4, a vertcial branch 5 parallel to the branch 3 and enclosed in a tubular steel casing 6 which contains the liquefied gas to be evaporated, and a lower bend 7.

The liquefied gas enters the lower part of the casing 6 by a tube 8 connected via a cock 44 to the liquid-containing part of a reservoir 43. The liquified gas is vaporized by thermic exchange with the heating liquid which rises by thermosiphonic effect in the branch 3 of the circuit and descends in the branch 5. The vaporized gas leaves at the top of the casing 6 by a tube 9 which conducts it to a thermostatic valve device 10. From the latter a duct 11 leads the vaporized gas to its place of use in a manner to be hereinafter described.

The thermostatic valve device 10, illustrated in detail in FIGURE 2, is of the kind in which fluid-tightness is realized by a flat rustless membrane and is actuated by the expansion of a hollow rod 12 immersed in the liquid contained in the tube 5. The casing of the device 10 is in three parts: the first part, marked 10a, is fixed to the framing of the apparatus (diagrammatically indicated at 46 in FIGURE 1) by any appropriate means and is cylindrical and formed with connections for the tube 9 and duct 11; the second part, marked 10b, is a more or less conical cover which may be made in one or several pieces and is screwed on to the part 10a; the third part, marked 10c, is a sort of connecting sleeve which carries the hollow rod 12. The device 10 comprises a valve 13 movable in a bore 14 in the part 10a and subjected to the action of a lifting spring 15 bearing against a head 16 of the valve and against an internal annular rib 17 in the bore 14. The valve 13 comes down upon a seating 18 surrounding the mouth of the tube 9 through the medium of an inset piece or obturator 19 made of plastic material having a Shore hardness of about 90. The rod 12 is rigidly connected to the part 10c of the device 10. Within the hollow rod 12 there is slidably inserted a solid rod 20 made of a material having very small coefficient of expansion such as "Nilo 36," "Cupron" or "Invar." The rod 20, which has its upper end engaged with the upper end of the hollow rod 12, acts upon the head 16 of the valve 13 through the medium of a presser 21 and a membrane 22 fixed in fluid-tight manner in the body of the device 10. The presser 21 has a head 21a which cooperates with an annular shoulder of the part 10b of the body of the device 10. Between the lower end of the rod 20 and the presser 21 there is interposed a disc 23 of elastic plastic material of lesser hardness than that of the inset 19 and preferably having a Shore hardness of 10–15 units less than that of the inset 19. This elastic disc may be replaced by a certain number of spring washers of the "Belleville" type serving the same purpose. The rod 20 permits the valve 13 to open under the action of the spring 15; the disc 23 (or the spring washers) serve the purpose of preventing crushing of the valve upon the seat 18 upon contraction of the hollow rod 12 when cooled, and permits the valve to open at an appropriate temperature, about 50° C. for example. By this means leakages are avoided which otherwise would eventually be produced by crushing of the valve. The different hardnesses of the inset 19 and disc 23 are very important in this respect.

The operation of the device 10 is as follows: when the evaporator is idle and cold, the hollow rod 12 has maximum contraction which causes the rod 20 to apply the inset 19 of the valve 13 hard upon the seat 18 against the action of the spring 15; when the temperature of the tube 2 is raised at the starting up of the apparatus the rod 12 expands, so that the valve 13 is free to be lifted under the action of the spring 15 to a greater or lesser extent according to the amount of expansion of the rod 12, that is to say according to the temperature of the heating liquid; the rod 20, which is practically non-expansible, controls this movement without opposing it; a greater or lesser quantity of vaporized gas can therefore pass from the tube 9 to the duct 11.

The vaporized gas leaving the thermostatic valve device 10 by the duct 11 arrives at an expansion valve or pressure reducer 24, adjusted for example to 4 kg., mounted on a panel 25 (FIGURE 1). From the pressure-reducer 24 the expanded gas passes through a tube 26 comprising a stop-cock 27 to a supply point 41. A branch 28 from the tube 26 conveys the gas for example at 4 kg., coming from the pressure reducer 24 to a pressure reducer 29 which feeds the gas through a tube 42 and under a reduced pressure, for example 37 g./cm.², to a heat control apparatus 30 (FIGURE 1) of a known type which supplies the burner 1. A tube 31 conducts the gaseous phase from the reservoir 43 containing the propane to be treated to a pressure reducer 32 which lowers the pressure of such gaseous phase to for example 3.5 kg./cm.², that is to say to a pressure 500 g./cm.² lower than that of the pressure reducer 24.

When the pressure reducer 24 is fed with vaporized liquid through the duct 11, the pressure in the branch 28 is 4 kg., if the pressure reducer 24 is adjusted for that value; that pressure also exists in a tube 33 connected at one end with the branch 28 and at the other end with the outlet from the pressure reducer 32. If the latter has been adjusted to give a delivery pressure of, say, 3.5 kg./cm.², the superior pressure in the tube 33 will prevent such delivery so that the gaseous phase in the reservoir 43 is not used whilst the evaporator is working with the liquid phase.

Inversely, when the thermostatic device 10 is closed upon the shutting down of the installation, the pressure reducer 29 is fed by the gaseous phase in the reservoir 43 by way of the pipe 31, pressure reducer 32 and tube 33 so that gas can pass through the tube 42 to the burner 1. A cock 34 may be provided in the tube 33.

The apparatus 30 controlling the heating, may be of known type, and preferably of the type sold under the reference THC 131 by la Societe "Chauffage et Gaz," 140 Rue Croix Nivert, Paris (XVe). It comprises a thermostat controlled by a member 35 submerged in the liquid in the thermosiphon and a safety pilot light 45 which extinguishes the burner 1 if the light 45 itself should be extinguished.

A safety valve 36 is preferably provided at the upper part of the apparatus. It may be associated with an expansion ball 37 connected by a short tube 38 with the upper bend 4 of the thermosiphonic circuit. A cock 39 is preferably inserted in the tube 38. By these means, complete safety in the working of the installation is achieved.

The general working of the installation is as follows: At the starting up of the installation, the cock 34 is opened so that the burner 1 can be lit and supplied with gas from the gaseous phase in the reservoir 43. When the liquid contained in the evaporator is at the desired temperature, the cock 44 on the tube 8 is opened so that liquefied gas can pass from the reservoir 43 to the evaporator. Care has already been taken to see that the pressure reducers 24 and 32 have been adjusted to the desired values, that is to say, about 500 gr. more for the pressure reducer 24 than for the pressure reducer 32 (for example, respectively 4 kg. and 3.5 kg.). At this moment, the pressure reducer 24 blocks the pressure reducer 32 and the burner is fed by the vaporized liquid gas. When the cock 27 is opened and the different apparatuses fed by the installation commence to consume vaporized gas, there is produced in the casing 6 a rise in the level of the liquid gas and consequently an augmentation of the surface in contact with the hot tube 5. The vaporization of gas is therefore also augmented and there is automatically established an equilibrium between the consumption of gas, the quantity of gas vaporized, and the level of the liquid in the evaporator. The thermostat 35 regulates the functioning of the burner 1 in such manner as to maintain a constant temperature of the water, for example between 60° C. and 90° C. in the case of propane. On the other hand, a safety pilot light 45 with thermo couple seen in FIGURE 1 cuts the supply of gas to the burner and to the pilot light in the event of accidental extinction of the latter. Finally, the thermostatic device 10 cuts off the delivery of vaporized gas if the predetermined temperature of the heating liquid falls below a predetermined value which corresponds to a safe level for the liquid gas situated preferably at one half of the available height of the casing 6. In this case, it is possible to continue to supply gas from the installation to the various apparatuses by drawing upon the gaseous phase in the reservoir 43; the pressure in the tube 28 falls below the normal, since the supply of gas through the duct 11 is cut off; consequently, the pressure reducer 32 can now allow gas to pass from the reservoir 43 under a pressure a little lower than the normal but sufficient, however, for not abruptly interrupting the feed of gas through the delivery 41 and thereby risking accidents. This passage from the liquid phase to the gaseous phase is performed automatically. When the fault has been repaired and the evaporator recommences to function normally, the pressure reducer 24 again operates and blocks the pressure reducer 32 as previously explained. Finally, for shutting down the installation, it is sufficient to close the cock 44. When the tubes and ducts are empty, as will be indicated by the hereinbefore described passing from the liquid phase to the gaseous phase, the cocks 34 and 27 are closed to complete the shutting down. The evaporator may then be cleaned if such operation is necessary.

I claim:

1. A plant having a supply outlet for distributing a vapor product therefrom, said plant comprising a reservoir having upper and lower portions adapted to contain gas in a liquid state in said lower portion, and gas in a vapor state in said upper portion; an evaporator comprising: a liquid heat exchanger of the thermo-siphonic type provided with a liquid therein and a burner adjacent said heat exchanger for heating the liquid in said exchanger, a first pipe between the liquid in said reservoir and said exchanger, a second pipe between said exchanger and said supply outlet, a third pipe between the vapor of the gas in said reservoir and said burner, a first pressure reducer in said third pipe, a second pressure reducer in said second pipe adjacent said supply outlet, a third pressure reducer in said third pipe between said vapor in the upper portion and said first reducer, a pipe having two ends, one of which is connected to said second pipe between the second pressure reducer and the supply outlet, the other of said ends being connected to the third pipe between the first and third pressure reducers, and thermostatic control valve means in said second pipe, said heat exchanger having a determinable temperature and providing a flow of vaporized liquid therefrom to said thermostatic control valve means, said control valve means automatically interrupting the flow of vapor product from said exchanger with the temperature of the heat exchanger being less than said determinable temperature, said first reducer being preset to a pressure suitable for the feeding of said burner, said second pressure reducer being preset to a determinable delivery pressure, said third reducer being preset to a pressure less than that of the second pressure reducer.

2. A method for automatically maintaining a predetermined delivery pressure at a supply outlet, of a vapor product supplied from gas contained in a reservoir, both in liquid state in the lower portion of said reservoir and in vapor state in the upper portion of said reservoir comprising successively expanding the gas in the vapor state in first and second stages to predetermined pressures, igniting said gas resulting from the second stage of expansion, transporting the liquid state of the gas from the reservoir to a heat exchanger, heating the liquid state of the gas to a vapor by said ignited gas, expanding said vaporized liquid to a predetermined pressure which is slightly higher than that of the gas in the vapor state in the first stage, connecting said resulting expanded vaporized liquid and said gas in the first stage towards said supply outlet, thermostatically regulating the flow of the vaporized liquid to the resulting connection of the expanded vaporized liquid and the gas in the first stage, supplying from the resulting connection the medium having the higher pressure.

3. Liquid gas evaporation plant according to claim 1, wherein the said heat exchanger comprises a closed steel tube circuit disposed in a substantially vertical plane and consisting of first and second rectilinear parts in parallel and substantially horizontal parts connecting together respective ends of said first and second parts, a flame tube disposed above said burner and extending through said first rectilinear part, a casing enclosing said second rectilinear part, means for conveying liquid gas to be vaporized to the lower part of an annular space intervening between said casing and said second rectilinear part, means for drawing off vaporized gas from the upper part of said annular space, and means for filling the said circuit with heating liquid.

4. Liquid gas evaporation plant according to claim 1, wherein said thermostatic control valve comprises a casing in several parts, a hollow rod highly expansible connected to said casing and partly immersed in the liquid of the heat exchanger, a solid rod practically non-expansible inserted in said hollow rod, a spring-lifted valve faced with an obturator of plastic material having a Shore hardness of at least 90, a fluid tight membrane mounted in said casing immediately over said valve, a presser piece inserted between the lower end of said solid rod and said membrane, an enlarged head on the lower end of said presser piece and adapted for engaging upwardly with a stop shoulder in said casing, and elastic means interposed between the lower end of said solid rod and said membrane, for the purpose set forth.

References Cited in the file of this patent

UNITED STATES PATENTS

| | | |
|---|---|---|
| 2,084,297 | Martin | June 15, 1937 |
| 2,456,889 | Olson | Dec. 21, 1948 |
| 2,535,364 | Lee | Dec. 26, 1950 |
| 2,558,051 | Jones | June 26, 1951 |
| 2,576,985 | Wildhack | Dec. 4, 1951 |
| 2,729,948 | Northgraves | Jan. 10, 1956 |